(No Model.)

R. W. THOMPSON.
ELECTRIC ENGINE.

No. 426,650. Patented Apr. 29, 1890.

Witnesses,
L. R. Howlett.
Geo. B. Tibbitts.

Inventor,
Robert W. Thompson.
by his Attorney Geo. W. Tibbitts

United States Patent Office.

ROBERT W. THOMPSON, OF CLEVELAND, OHIO, ASSIGNOR OF ONE-EIGHTH TO GEO. W. TIBBITTS AND JAMES C. O'NEIL, BOTH OF SAME PLACE.

ELECTRIC ENGINE.

SPECIFICATION forming part of Letters Patent No. 426,650, dated April 29, 1890.

Application filed January 23, 1890. Serial No. 337,900. (No model.)

*To all whom it may concern:*

Be it known that I, ROBERT W. THOMPSON, a citizen of the United States, residing at Cleveland, in the county of Cuyahoga and State of Ohio, have invented certain new and useful Improvements in Electric Engines, of which the following is a specification.

This invention has for its objects to provide in one combined, compact, and complete apparatus an economical, convenient, and ready means for generating and employing electric power for locomotion and other uses, avoiding all the cumbersome, expensive, and dangerous appliances for conducting electricity from source of generation to places of employment.

The invention consists of a dynamo and a motor for running it, a storage or receiving battery, and a motor for power or propulsion combined and arranged in close juxtaposition, whereby electricity is generated, stored, and employed within a very small compass without loss or diminution by long conducting appliances.

Figure 2:
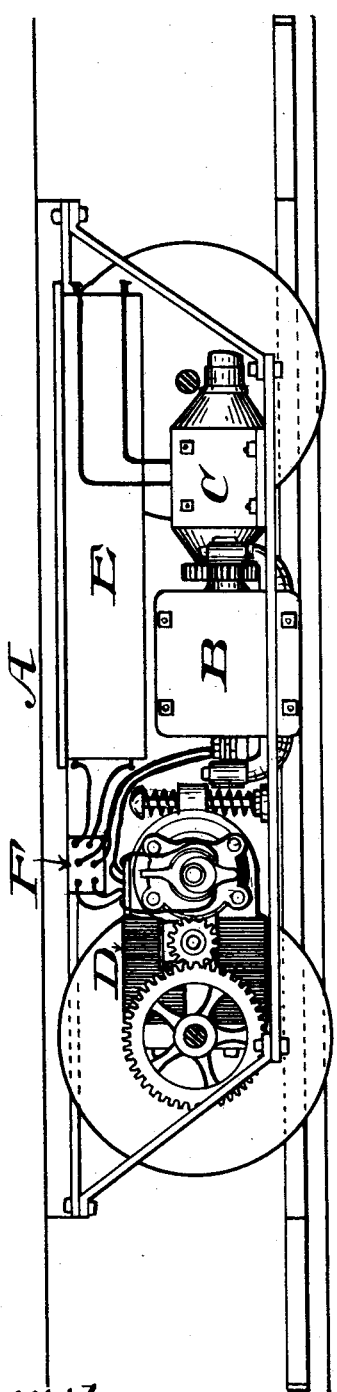
Figure 1:
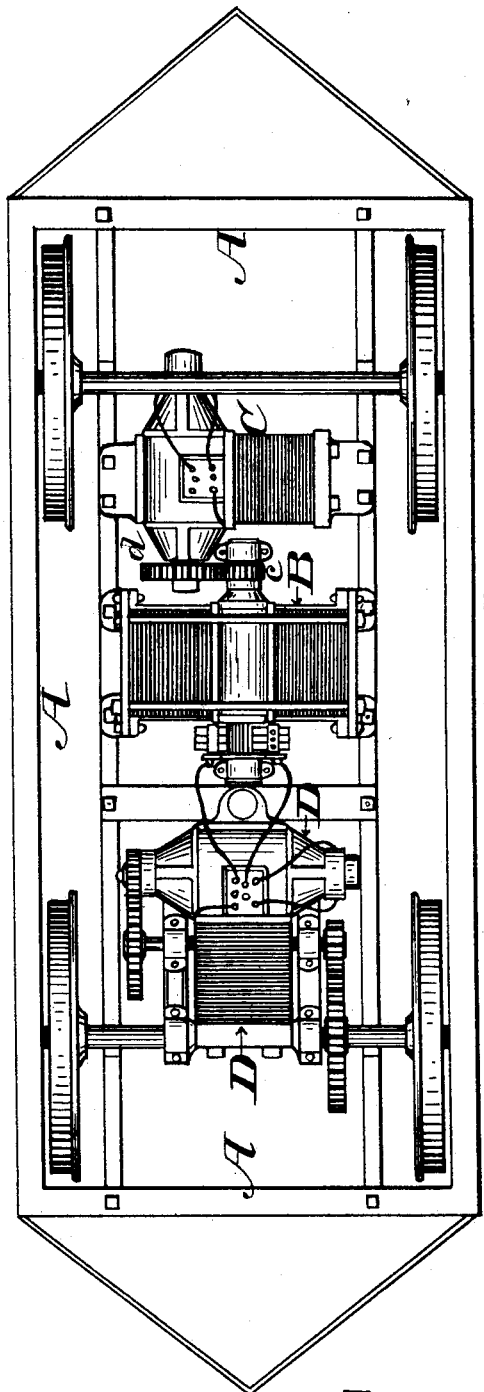

In the accompanying drawings, Figure 1 is a top or plan view of a car-truck, showing the dynamo and motors attached. Fig. 2 is a side elevation of the same with the side car-wheels removed, showing the dynamo, motors, and storage or receiving battery as they may be arranged for co-operation.

A represents a car-truck, which may be of any of the well-known and suitable constructions.

B represents a dynamo supported by the frame-work of the truck, and C is a motor located by the side of said dynamo, and connected therewith by gears *c d* or other equivalent means, whereby said motor may operate the dynamo, proportioned to impart greater speed to the dynamo.

D is a motor connected with the axle of the car-truck, and may be of any of the forms or kind now in use.

E is a storage or receiving battery located over the dynamo and motor C, and supported by suitable means on the truck-frame. The storage or receiving battery may be constructed of any of the known materials suitable for such purposes, and in convenient form and dimensions for receiving and holding electricity. The battery is connected with the motor C by a conducting-wire. The dynamo is connected with motor D, and also with commutator-box F. Motor D is also connected with the commutator-box F, and box F is connected with battery E by suitable conductors. Thus circuits are formed from battery E with motor C and from dynamo with motor D and battery E.

The mechanisms for manipulating these electric currents commonly employed (not shown) are to be used in connection with this system of electrical enginery. The working of this system is as follows: First, the storage-battery is charged with electricity to any desired degree by any suitable means. This may be done by the use of motor C and dynamo B by disconnecting said motor from the battery and applying other electric power to motor C and charging the battery with dynamo B, or dynamo B might be disconnected from motor C and mechanical power applied to said dynamo for the time for charging the battery. When the battery has been thus charged and motor C again connected therewith and the dynamo connected with the motor, the mechanism is ready for operation. Motor C is now put in motion and the dynamo begins generating electricity, which is applied to motor D for propelling the car, and the surplus not used by the said motor is conducted to the receiving-battery, and, furthermore, during such times as motor D is not running, as when the car may be running by its momentum, or during stoppages, the dynamo will be generating electricity and restoring the receiving-battery.

Having described my invention, what I claim, and desire to secure by Letters Patent, is—

The combination of storage-battery E, motor C, connected by suitable conductors with said battery, dynamo B, suitably connected with said motor C, and connected by suitable conductors with motor D, and also with the said battery E, substantially as and for the purpose specified.

ROBERT W. THOMPSON.

Witnesses:
GEO. W. TIBBITTS,
ABNER SLUTZ.